US012710930B2

(12) United States Patent
Hoban et al.

(10) Patent No.: US 12,710,930 B2
(45) Date of Patent: Aug. 18, 2026

(54) REUSABLE MULTI-LANGUAGE COMPONENT FOR A DESIRED STATE CONFIGURATION SYSTEM

(71) Applicant: Pulumi Corporation, Seattle, WA (US)

(72) Inventors: Lucas James Hoban, Seattle, WA (US); Patrick Duncan Gavlin, Seattle, WA (US); Justin Robert Van Patten, Redmond, WA (US)

(73) Assignee: Pulumi Corporation, Seattle, WA (US)

( * ) Notice: Subject to any disclaimer, the term of this patent is extended or adjusted under 35 U.S.C. 154(b) by 23 days.

(21) Appl. No.: 17/817,944

(22) Filed: Aug. 5, 2022

(65) Prior Publication Data

US 2023/0037416 A1 Feb. 9, 2023

Related U.S. Application Data

(60) Provisional application No. 63/259,892, filed on Aug. 6, 2021.

(51) Int. Cl.

| | |
|---|---|
| ***G06F 9/44*** | (2018.01) |
| ***G06F 8/30*** | (2018.01) |
| ***G06F 8/34*** | (2018.01) |
| ***G06F 9/451*** | (2018.01) |

(52) U.S. Cl.

CPC .................. *G06F 8/31* (2013.01); *G06F 8/34* (2013.01); *G06F 9/454* (2018.02)

(58) Field of Classification Search

CPC ............... G06F 8/31; G06F 8/34; G06F 9/454

See application file for complete search history.

(56) References Cited

U.S. PATENT DOCUMENTS 5,511,199 A * 4/1996 Anthias .................... G06F 8/76 703/27
2005/0166182 A1* 7/2005 Wang ........................ G06F 8/31 717/114
2015/0120889 A1* 4/2015 Sapaliga ............ H04L 41/5041 709/221
2017/0102925 A1* 4/2017 Ali ............................ G06F 8/30
2019/0294477 A1* 9/2019 Koppes ................. G06F 9/5072
2019/0318312 A1* 10/2019 Foskett ................. G06F 9/5072

(Continued)

*Primary Examiner* — Bradley A Teets
*Assistant Examiner* — Lenin Paulino
(74) *Attorney, Agent, or Firm* — Fenwick & West LLP

(57) ABSTRACT

A multi-language component management system allows users to create and reuse reusable components in various supported languages for a desired state configuration system. The system manages creation and construction of reusable multi-language components. The system may receive a request to create an instance of a component in a first configuration language. The request may include input parameters for creating the instance. The component may be authored in a second configuration language different from the first configuration language and may include resources such as child components that depend on the component. The system may generate output properties containing information for generating the plurality of resources. The system may recursively construct the child components that depend on the component, which may in turn result in construction of additional resources. In response to the dependency of the component is resolved, the system outputs a set of completely resolved output properties.

19 Claims, 8 Drawing Sheets

(56) References Cited

U.S. PATENT DOCUMENTS

| | | | | |
|---|---|---|---|---|
| 2019/0342166 | A1* | 11/2019 | Chaware | G06F 9/5055 |
| 2021/0111949 | A1* | 4/2021 | Collins | G06F 9/5072 |
| 2021/0208934 | A1* | 7/2021 | Jadhav | G06F 8/60 |
| 2021/0216286 | A1* | 7/2021 | Villegas | G06F 8/315 |
| 2022/0012045 | A1* | 1/2022 | Rudraraju | G06F 8/36 |

* cited by examiner

REUSABLE MULTI-LANGUAGE COMPONENT FOR A DESIRED STATE CONFIGURATION SYSTEM

RELATED APPLICATIONS

This application claims the benefit of Provisional Application No. 63/259,892, filed on Aug. 6, 2021, which is incorporated herein by reference.

TECHNICAL FIELD

The disclosed embodiments generally relate to desired state configuration. In particular, the disclosed embodiments are directed to managing reusable multi-language components for a desired state configuration system.

BACKGROUND

Third-party cloud computing services such as Amazon Web Services (AWS™), Azure™, Google Cloud™, Kubernetes™, and others provide various cloud computing resources to individuals or organizations on demand. An infrastructure is the foundation of an information technology (IT) service and may include various resources hosted by third-party cloud computing services. The various resources of an infrastructure may have complex structure and dependencies. An infrastructure-as-code (IaC) service may help manage and provision the various resources through machine-readable files.

Users of an IaC service may create components which are logical groupings of resources that are connected with specific configurations. Components can be authored by users in various programming languages. With current IaC services, computer programs (i.e. originating program that may contain components) written in one language are not able to use components in a different language. For example, a program that is written in Python is not able to reuse a component authored in TypeScript, and as a result, the user may need to reimplement a similar component in Python. This is not efficient for users of current IaC services and limits the open resources available for users to reuse.

SUMMARY

Systems and methods are disclosed for a desired state configuration system that includes a multi-language component management system allowing users to create and deploy (e.g. reuse) reusable components in various supported languages. The desired state configuration system may be designed to manage state of any sort of system, such as operating system process state, cloud-based infrastructure, and physical systems configuration (e.g. remote protocol calls such as CRUD (create/read/update/delete) operations to resource providers such as AWS, etc.). The multi-language component management system manages creation and construction (e.g. deployment) of reusable multi-language components. The system may receive, from a user, a request to create an instance of a reusable multi-language component in a first configuration language. The request may include a set of input parameters for creating the instance. The component may be authored in a second configuration language that is different from the first configuration language. The component may include a plurality of resources such as child components that depend on the component. The multi-language component management system may generate a set of output properties containing information for generating the plurality of resources. The multi-language component management system may recursively construct the child components that depend on the component, which may in turn result in construction of additional resources. In response to the dependency of the component is resolved, the multi-language component management system outputs a set of completely resolved output properties (i.e. complete output properties) based on which the plurality of resources may be constructed.

The systems and methods disclosed herein provide several technical advantages. For example, the systems and methods disclosed herein provide a solution for a user to manage state for any system using components across different languages. The user may reuse components authored in a language that is different from the language that the originating program (i.e. the program that the user instantiates the component) is coded in. For example, a first user may author a component including various resources connected in a complicated structure. The component is authored in a first configuration language. A second user, who wishes to reuse the component in a computer program that is coded in a second language, may reuse the component through the disclosed system and method. In conventional implementations of desired state configuration systems, the user is not able to reuse a component in a different language and may need to reconstruct the complicated dependency of resources by recoding the structure in the different language. The system and method disclosed herein extends a desired state configuration system with the ability to create and reuse components written in any supported language and therefore make open-source resources (such as components) available to a larger population of programmers.

The features and advantages described in this summary and the following detailed description are not all-inclusive. Many additional features and advantages will be apparent to one of ordinary skill in the art in view of the drawings, specification, and claims hereof.

The FIGURES depict various embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
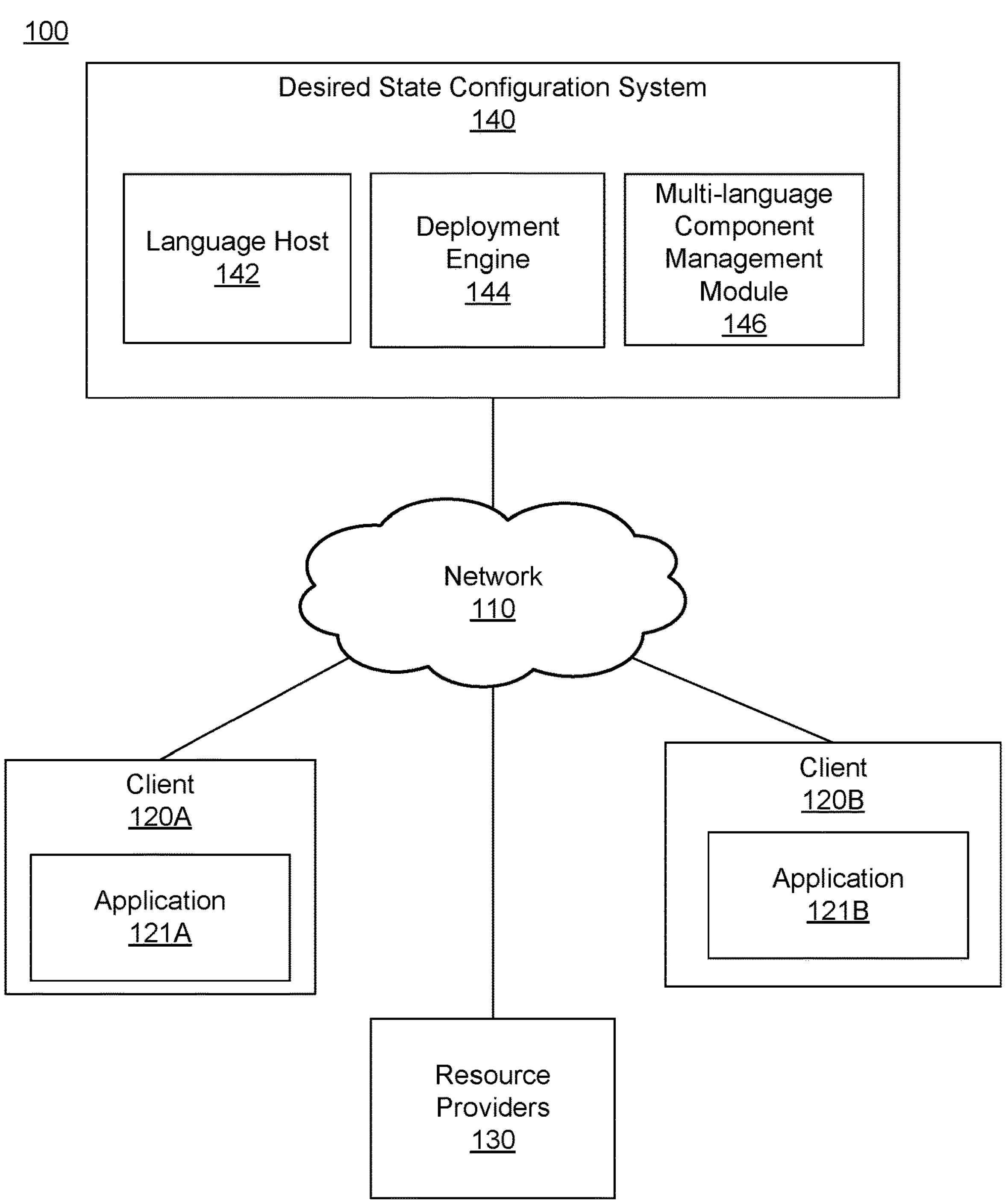
FIG. 1 shows a diagram of a system environment of a desired state configuration system, according to example embodiments.

FIG. 1 shows a system environment 100 including, network 110, client devices 120A and 120B (collectively or individually "120"), resource providers 130 and an desired state configuration system 140 that provides various services for users of client 120 to manage infrastructure for an IT service.

The network 110 may be any suitable communications network for data transmission. In some embodiments, the network 110 is the Internet and uses standard communications technologies and/or protocols. Thus, the network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

In one embodiment, client devices 120 communicate with desired state configuration system 140 through network 110. Client devices 120 generally include devices and modules for communicating with multi-language component management module 146 and a user of client device 120. Other components of a client device 120 may include display device, one or more computer processors, local fixed memory (RAM and ROM), as well as optionally removable memory (e.g., SD-card), power sources, and audio-video outputs.

In another embodiment, client device 120 may communicate with desired state configuration system 140 through an application or software module, such as applications 121A and 121B (collectively or individually "application 121"). The application 121 may be provided by desired state configuration system 140 for installation on client devices 120. Users of client device 120 may manage infrastructure of an IT service by using application 121 to access modules and resources provided by desired state configuration system 140. Application 121 may take various forms, such as a stand-alone application, an application plug-in, or a web console application (e.g. through webpages). Application 121 may generate an interface which is one means for performing this function.

Users of client devices 120 may wish to build an IT service with infrastructure including a set of resources with specific configurations (i.e. input parameters), and the specific configurations associated with the set of resources may be referred to as a desired state configuration for the infrastructure. For example, the user may specify a number of virtual machines connected with a number of storage units in a certain way described by a set of input parameters, and the set of input parameters associated with the infrastructure may be referred to as the desired state configuration for the infrastructure. The desired state configuration system 140 may be designed to manage the state of any sort of system, from operating system process state, to cloud-based infrastructure, to physical systems configuration. Users of client devices 120 may create computer programs (e.g. originating computer programs containing executable instructions) in supported programming languages such as Python, JavaScript, Go, and Typescript, etc. to manage resources provided by resource providers 130 through the application 121.

Resource providers 130 may provide various cloud computing services or may be any other system that provides desired state configuration service to individuals and organizations. Resource providers 130 may include physical resource providers and component resource providers. Physical resource providers are providers that offer resources to individuals and organizations on demand and physical resource providers may manage resources on their own platforms. For example, AWS, Google Cloud, Azure, and Kubernetes are examples of physical resource providers that offer physical resources. Physical resources are resources offered and managed by physical resource providers, including but are not limited to processing power, virtual machines, data storage capacity, and networking. (The physical resources thus may include virtual resources, such as those of a cloud computing service, that ultimately correspond to a physical resource.) A user of the physical resource providers may manage state of a system through create, read, update and delete (also referred to as CRUD) operations to the physical resource providers. Component resource providers may be users of desired state configuration system 140 who are authors of component resources (also referred to as components). A component resource may be a logical grouping of resources, including both physical resources and component resources. For example, a component resource may include a physical resource and a child component resource that further includes multiple physical resources.

Desired state configuration system 140 includes a language host 142 that creates an environment for a program and executes the program, a deployment engine 144 that determines operations to be performed to reach a desired state configuration, and a multi-language component management module 146 that manages reusable multi-language components. A multi-language component is a reusable component that is authored in one language and may be used in an originating computer program written in a different supporting language. Desired state configuration system 140 may provide various modules and resources for managing infrastructure. The desired state configuration system 140 may support configuration for any system with a programmable interface, which could include physical systems, operating system state, etc. In the embodiment illustrated in FIG. 1, desired state configuration system 140 and the modules included are shown as a separate entity from client device 120, while in alternative embodiments, the modules may also be located locally on client device 120.

Language host 142 creates an environment for a program and executes the program in the environment generated for the program. Language host 142 may receive requests to launch a program that includes a set of parameters that describe a desired state configuration. Language host 142 may execute the program and launch an environment (e.g. runtime) based on the language in which the program is written. The language runtime prepares the program to be executed and detects necessary resource registrations. Language host 142 may notify respective resource providers 130 who may perform the necessary resource registration. When the new resources are registered, language host 142 sends a request to deployment engine 144 which further computes the operations needed to reach the desired state configuration.

Deployment engine 144 determines the operations to be performed to reach a desired state configuration from a given state configuration (e.g., the current state configuration of the system). Deployment engine 144 may receive a request from language host 142 indicating a list of resources needed for the desired state configuration. Deployment engine 144 receives the list and determines new resources to create and existing resources to delete based on the list of resources for desired state configuration and current state configuration. Deployment engine 144 may send remote procedure calls (RPCs) to resource providers 130 to perform operations (e.g. create, read, update, delete or CRUD operations) on physical resources. Thus, rather than achieving the desired state configuration by assembling that state from the starting point of a "blank slate," the deployment engine 144 instead starts from (e.g.) the current state configuration of the system and makes only the changes needed to achieve the desired state configuration. This has a number of advantages over a "blank slate" approach (such as tearing down a given cloud environment and starting over each time the system is reconfigured), such as typically requiring far fewer computing operations to achieve, preserving the state of the system (e.g., data subsequently entered by customers into databases), and providing much greater system uptime.

Multi-language component management module 146 manages creation and construction (e.g. deployment) of multi-language components. For example, client 120A may author a multi-language component using resources and modules provided by multi-language component management module 146 in a first language (e.g. TypeScript) and the created component is available for another client 120B to use in another configuration language (e.g. Python), which is achieved through the following process.

Multi-language component management module 146 may generate a software development kit (SDK) for each supported language (e.g. JavaScript, TypeScript, Python, Go, C#, F#, HCL) based on a schema of the component that client 120A authored (e.g. in JSON, TypeScript, or other source forms). Client 120B, who wishes to use the component in another language, imports the SDK in one of the supported languages (e.g. Python). Client 120B, may use the SDK to create an instance of the component with a set of input parameters. The instance of the component may be created based on the structure of the component with different input parameters. Multi-language component management module 146 may construct the resources included in the component. If the component is dependent on additional components (i.e. child components), multi-language component management module 146 may recursively construct the additional components which may in turn register additional resources. The recursive process stops executing if the additional resources that need to be constructed are physical resources, because the physical resources are managed by physical resource providers (e.g. AWS), in which case the deployment engine 144 may perform operations by sending RPCs (e.g. create, update, delete, read, which may also refer as CRUD) to physical resource providers 130. When the recursive process is finished, client 120B may receive a set of complete output properties including resource references, from which the desired resources may be constructed, and the desired state configuration may be achieved. Further details regarding multi-language component management module 146 are illustrated in accordance with FIG. 2 and FIG. 4.

Figure 2:
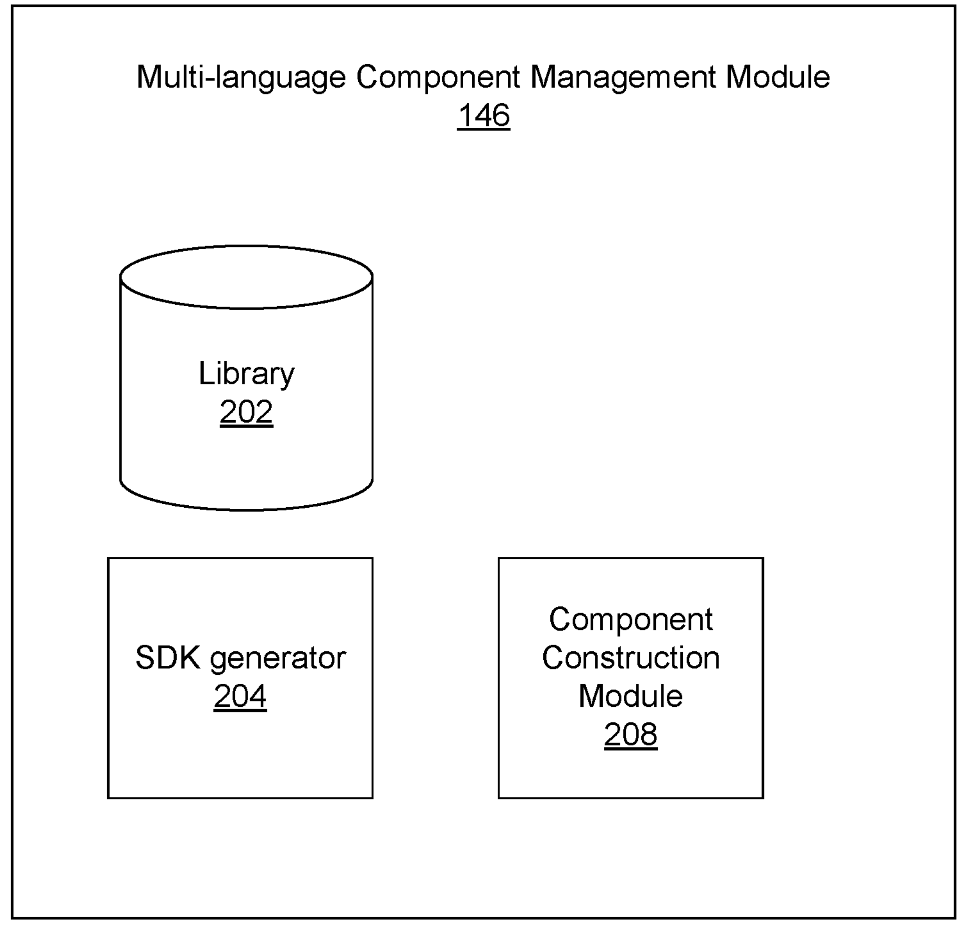
FIG. 2 shows a block diagram of the multi-language component management module, according to example embodiments.

FIG. 2 illustrates one embodiment of a variety of modules included in a multi-language component management module 146. In one embodiment, multi-language component management module 146 includes a library 202 that stores resources available for clients 120 to use, an SDK generator 204 that generates SDKs for a multi-language component and a component construction module 208 that constructs components and resources for a desired state configuration.

Figure 5A:
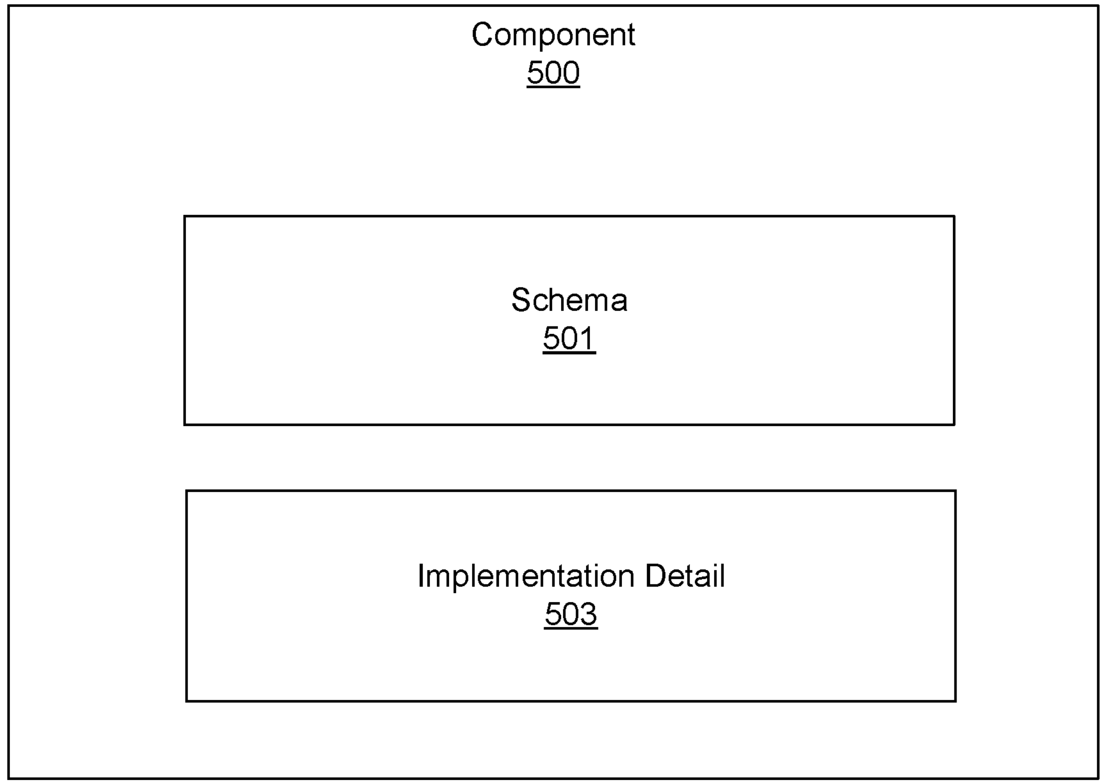
FIG. 5A shows an example data structure of a multi-language component, according to example embodiments.

Library 202 stores libraries available for clients 120 to use to manage desired state configuration for an infrastructure. For example, library 202 may store reusable multi-language components that client 120 may import and reuse. In one embodiment, client 120A may author a reusable multi-language component that is published and saved in library 202. Library 202 may also store the generated SDKs associated with components. Client 120B may reuse the component by importing an SDK generated by the multi-language component management module 146. For example, FIG. 5A illustrates one exemplary data structure for a component 500 including schema 501 and implementation detail 503, where the schema 501 may contain information that describes content included in the component 500 and implementation detail 503 contains details such as the child components included in the component 500 and how the child components are wired together. Schema 501 is discussed in further detail in accordance with FIG. 5B.

Figure 5B:
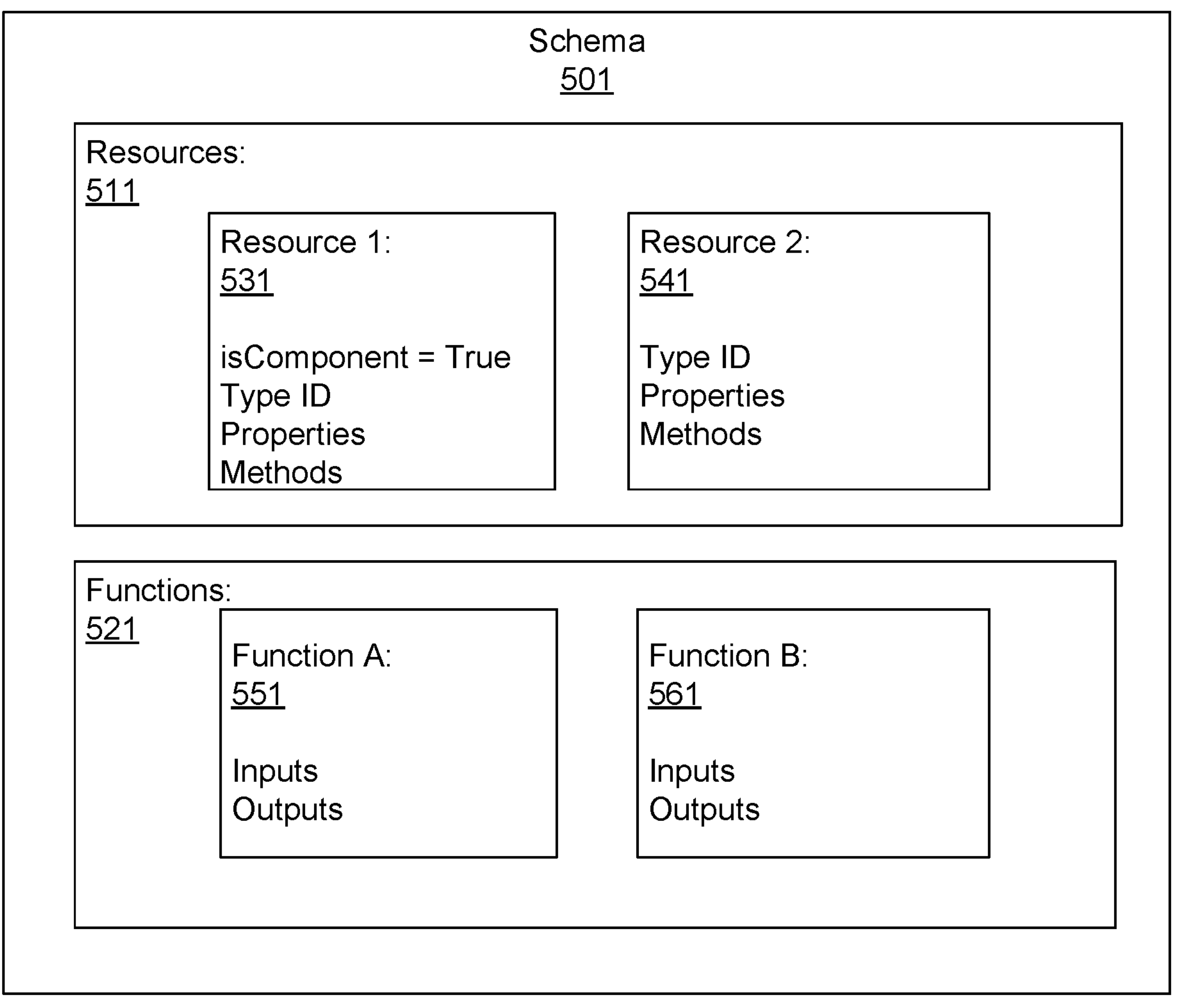
FIG. 5B shows an example data structure of a schema for the multi-language component, according to example embodiments.

FIG. 5B illustrates one exemplary data structure of a schema for component 500. Schema 501 may include information associated with resources 511 and functions 521 that are included in component 500. In the exemplary data structure shown in FIG. 5B, component 500 includes resources 531 (resource 1) and 541 (resource 2), each resource including information associated with the respective resource such as TypeID, properties and methods. Resource 1 may have an indicator that indicates the resource is a component resource (i.e. dependent on additional resources). For example, resource 1 may have an indicator that says "isComponent=True." SDK generator 204 may read this information and generate SDKs for the component resource. SDK generator 204 is discussed in further detail below. One concrete example of a set of related code for a simplified example component is provided below in Appendix A.

Figure 5C:
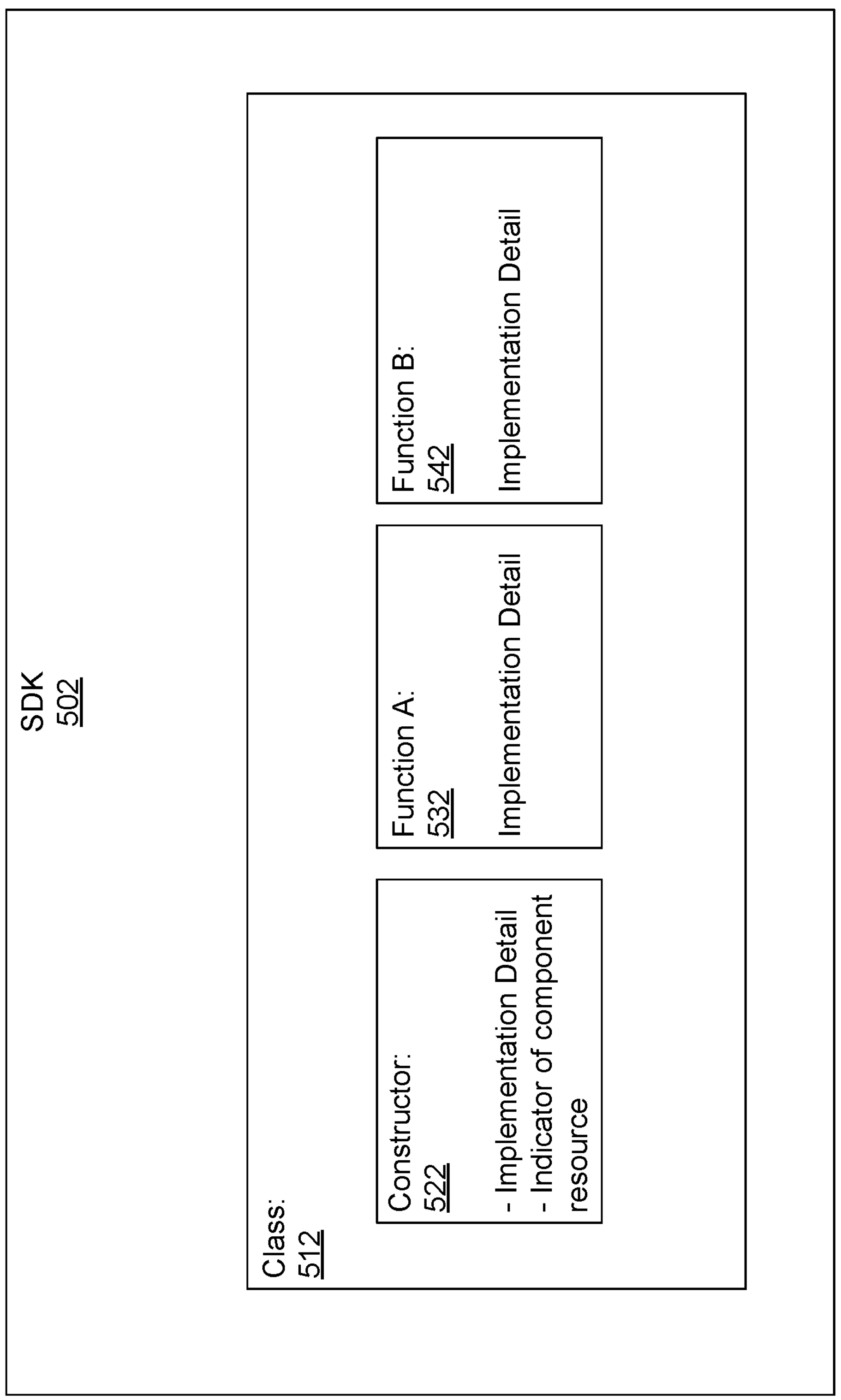
FIG. 5C shows an example data structure of a software development kit (SDK) generated based on the multi-language component, according to example embodiments.

Referring back to FIG. 2, SDK generator 204 generates SDKs for a multi-language component. In one embodiment, SDKs are generated based on a schema of a multi-language component, such as the one illustrated in FIG. 5B. Based on the indicator in resource 1 (FIG. 5B, 531) that says "isComponent=True," SDK generator 204 may process this information and include in the generated SDK a similar indicator indicating that the resource is a component resource. For example, FIG. 5C illustrates an exemplary SDK 502 generated based on schema 501 presented in FIG. 5B. The SDK 502 is for illustration purposes, while in reality a generated SDK may include more information such as libraries imported, additional classes and additional functions. The SDK generator 204 may generate an SDK for each supported language (e.g. JavaScript, TypeScript, Python, Go, C#, F #, HCL) based on the component 500.

Therefore, structure and content of SDK 502 may also vary depending on the language that the SDK is generated in.

Continuing with the discussion of the structure of SDK 502 in FIG. 5C, SDK 502 may include class 512 with a constructor function 522 that constructs an instance of the component 500. Class 512 may also include function A 532 and function B 542, which are also included in the schema 501 in FIG. 5B. Implementation details of function A 532 and function B 542 may be defined in the implementation detail 503 in FIG. 5A. SDK generator 204 may generate an indicator in constructor 522 indicating that component 500 is a component resource because the component 500 depends on additional resources such as resources 531 (resource 1) and 541 (resource 2) as shown in FIG. 5B.

Figure 3:
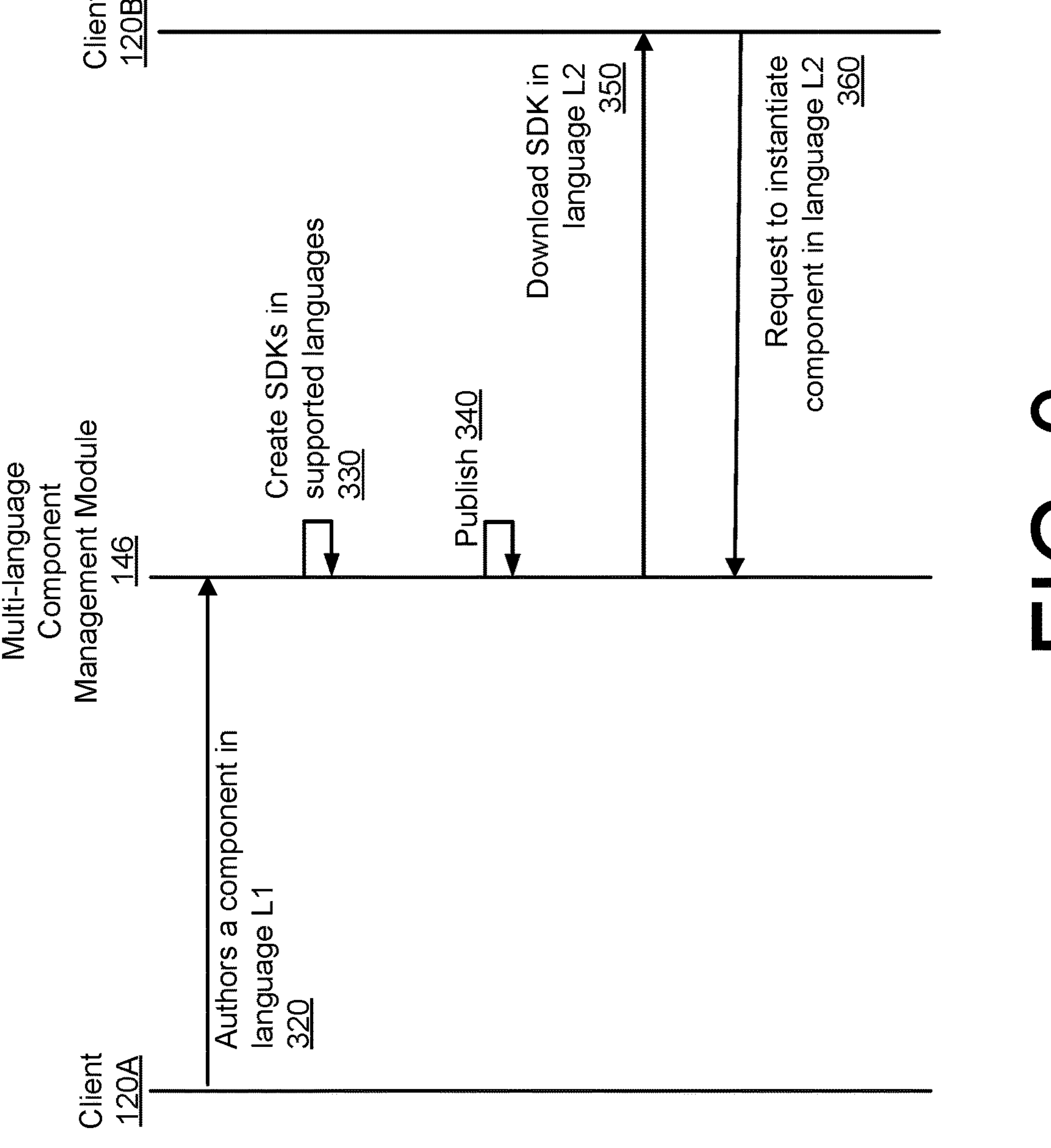
FIG. 3 shows a sequence diagram for creating a reusable multi-language component, according to example embodiments.

FIG. 3 illustrates one exemplary process of generating an SDK for each supported language. Client 120A may author 320 a component in a first language L1 (e.g. TypeScript). In one embodiment the component may include a schema that describes information associated with the content in the component. Client 120A may author 330 the component via an interface provided by application 121A and publish the component in the multilanguage component management module 146 via application 121A. Multi-language component management module 146 may create 330 SDKs in a variety of supported languages such as JavaScript, TypeScript, Python, Go, C#, F #, and HCL. In one embodiment multi-language component management module 146 may publish 340 the SDKs to respective package managers such as Node Package Manager (npm). Client 120B may wish to use the component in a second language L2 such as Python. Client 120B may download 350 and import the SDK in Python via application 121B. Client 120B may request 360 to generate an instance of the component in a program that client 120B authors, specifying a set of input parameters that describe a desired state configuration for the component that client 120B wishes to construct. Component construction module 208 of multi-language component management module 146 may initiate a process that constructs the component with the set of input parameters, which is further discussed in accordance with component construction module 208.

Figure 4:
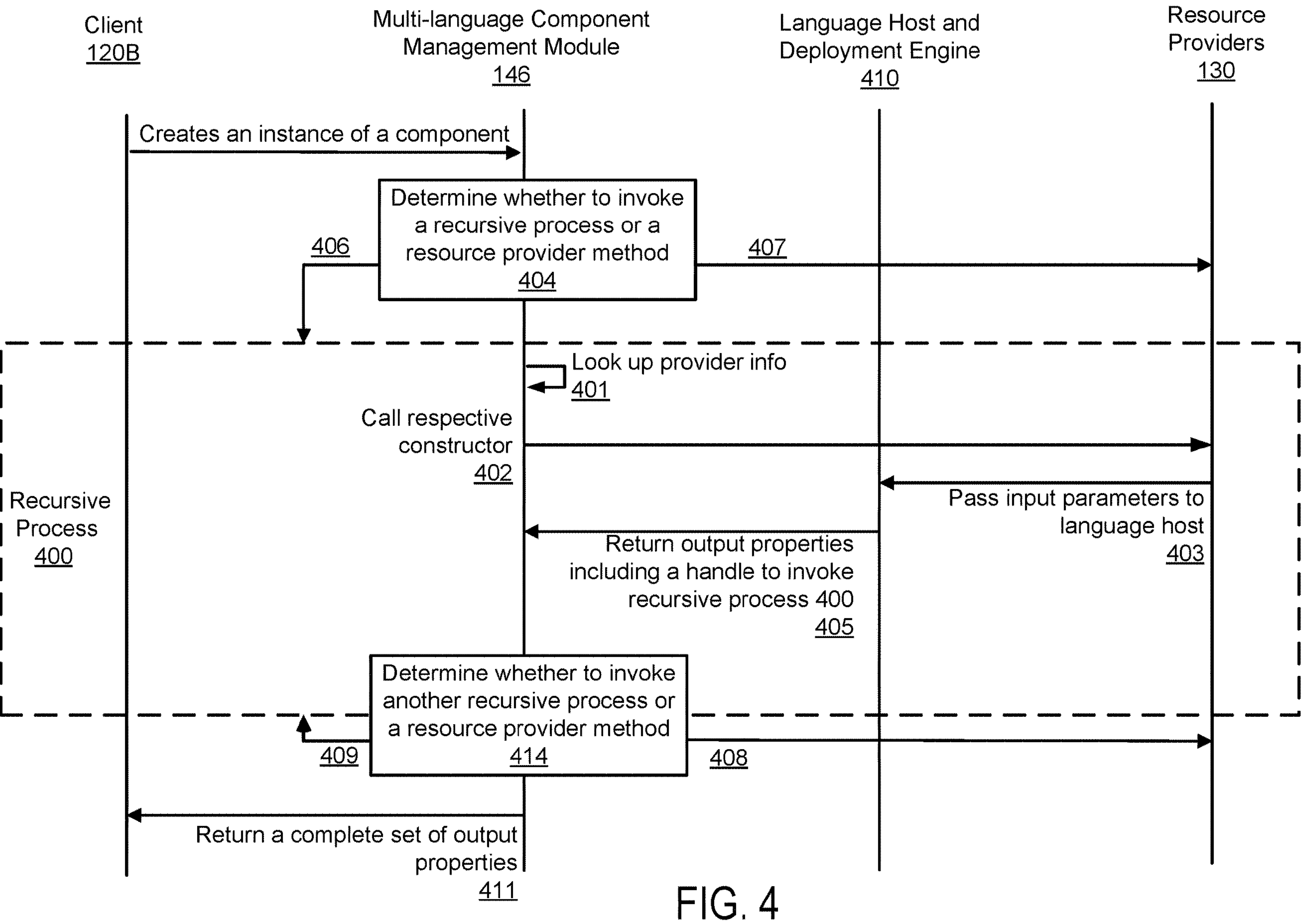
FIG. 4 shows a sequence diagram for deploying a reusable multi-language component, according to example embodiments.

Component construction module 208 constructs components for a desired state configuration. FIG. 4 illustrates one exemplary embodiment for constructing an instance of a multi-language component module. Responsive to client 120B requesting to instantiate a component, multi-language component management module 146 may determine 404 whether to invoke a multi-language component construction call (e.g. recursive process 400) or a CRUD operation to physical resource providers 130. The determination may be based on whether the instance initiated is a component resource (e.g. based on an indicator in schema 501). Responsive to determining that the resource to construct is a physical resource, a CRUD operation 407 may be issued to physical resource providers 130. (For example, the CRUD operation 407 might create a particular physical resource, such as a database, or update it, e.g., by changing its access permissions.) On the other hand, responsive to determining that the resource to construct is a component resource, the component construction module 208 may initiate a recursive process 400 (which may also be referred to as a Construct call). In one embodiment, component construction module 208 identifies in the SDK based on an indicator that the resource to construct is a component resource that depends on additional components and resources, component construction module 208 may initiate a recursive process 400 to construct the requested component which recursively drives construction of additional components (e.g. child components) and resources that depend on the requested component. In one embodiment, a child component may be authored in a different language and each second-level child component (i.e. child component of a child component) may be authored in a language that is different from the requested component and the child component. The recursive process outputs a complete set of output properties for constructing the component with the set of output properties including resources references for the resources included in the component. Recursive process 400 is discussed in further detail below.

For each iteration of the recursive process 400, component construction module 208 may start with looking up 401 resource provider information (e.g. information associated with a package that contains the component) based on a type identifier of the instantiated component. Multi-language component management module 146 may then determine whether to invoke the recursive process 400 (e.g. a Construct call) or to invoke a physical resource provider method (e.g. CRUD operation). Based on a determination that the component to create is a resource component, the component construction module 208 may then construct the component by calling 402 the respective constructor for the component based on the resource provider. The constructor may then dispatch the code to language host and deployment engine 410, where the program may be executed and a set of additional components and resources to construct are determined. Language host and deployment engine 410 may deserialize the additional resources to resource references and include the resource references in a set of output properties (i.e. a set of specific configurations to construct the requested component including configuration for each individual resource included in the component). Language host and deployment engine 410 may return 405 the set of output properties including resource references to multi-language component management module 146. In one embodiment, the set of output properties may include a handle indicating that additional components need to be constructed.

The multi-language component management module 146 may then determine 414, based on the additional components to be constructed, whether to invoke another recursive process 400 or invoke a CRUD operation to physical resource providers 130. The determination is based on whether the additional components to be constructed are physical resources or component resources. Based on a determination that the additional components are physical resources managed by physical resource providers, the multi-language component management module 146 may invoke CRUD operations, and based on a determination that the additional components are component recourses, the multi-language component management module 146 may invoke 409 another recursive process. Multi-language component management module 146 may determine additional resources to construct based on the handle passed back in the set of output properties and reiterate the recursive process 400 by looking 401 up provider information based on the output properties. The recursive process 400 terminates when multi-language component management module 146 determines that the additional resources to construct are physical resources. The determination that the additional resources to construct are physical resources may be referred to as a terminating condition. In another embodiment the terminating condition may be that the handle in the output properties indicates that the recursive process should be terminated. Because the physical resources are managed by third-party resource providers such as AWS, language host and deployment engine 410 may send RPCs (e.g. create, read, update, delete) to physical resource providers and the operations are performed by physical resource providers, and therefore the recursive process 400 may stop executing.

Figure 6:
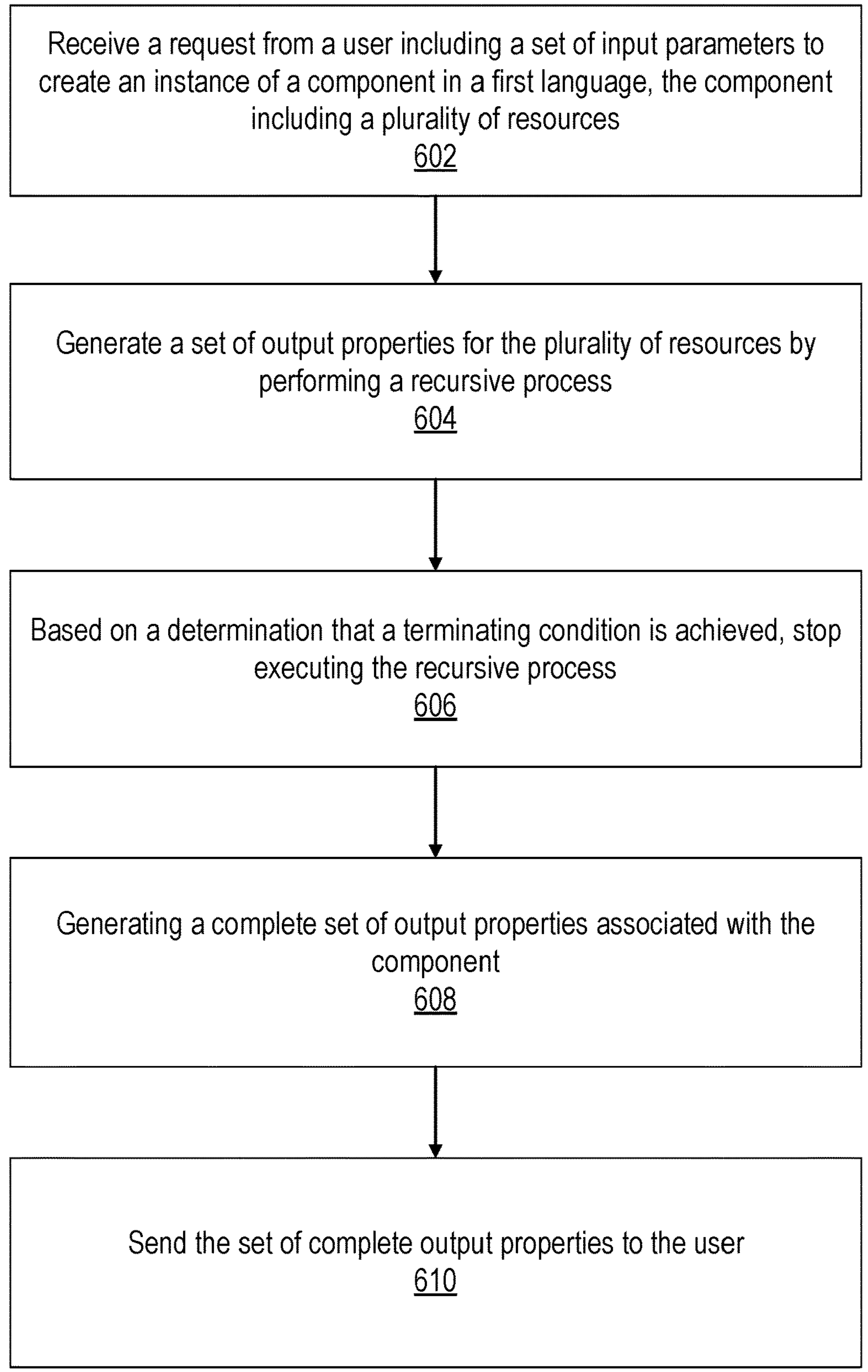
FIG. 6 shows an exemplary process for constructing a reusable multi-language component.

FIG. 6 illustrates an exemplary process for using a multi-language component. The process 600 starts with a multi-language component management module 146 receiving 602 a request from a client 120 to create an instance of a component in a first configuration language. The component may include a plurality of resources (e.g. component resources and physical resources.) The component is authored in a second configuration language. Component construction module 208 may generate 604 a set of complete output properties for the plurality of resources by performing a recursive process that constructs additional components that the component depends on. Component construction module 208 may determine whether to invoke another recursive process or to invoke CRUD operations based on whether the additional components are resource components or physical resources. Component construction module 208 may stop 606 executing the recursive process based on a terminating condition that the additional resources to construct are physical resources. Multi-language component management module may generate 608 a complete set of output properties associated with the component and send 610 the set of complete output properties to the user. The output properties may be used to construct the plurality of resources in the target computing environment (e.g., a cloud computing system).

ADDITIONAL CONSIDERATIONS

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regard to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present technology is not described with reference to any particular programming language. It will be appreciated that a variety of programming languages may be used to implement the teachings of the present technology as described herein, and any references below to specific languages are provided for disclosure of enablement and best mode of the present technology.

While the technology has been particularly shown and described with reference to a preferred embodiment and several alternate embodiments, it will be understood by persons skilled in the relevant art that various changes in form and details can be made therein without departing from the spirit and scope of the technology.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

APPENDIX A

Appendix A contains four related code listings for a simple example: displaying the "Hello, world!" message in a static page hosted on the Amazon™ S3™ cloud storage system.

The document "schema.yaml" includes markup language defining the schema for a package named "xyz" that contains a simple component named "StaticPage" that contains HTML content.

The document "staticPage.go" includes procedural code in the "Go" programming language that provides the implementation of the "StaticPage" type declared in "schema.yaml". The implementation (among other things) creates a storage "bucket" in the Amazon S3 cloud storage system for a static index web page.

The document "staticPage.ts" is an SDK generated based on the "schema.yaml" schema and allowing the "StaticPage" component to be called from within the TypeScript procedural programming language.

Finally, the document "index.ts" contains an example TypeScript program that constructs an instance of the StaticPage component that displays the message "Hello, world!", using the SDK provided by "staticPage.ts".

schema.yaml

```
name: xyz
resources:
  xyz:index:StaticPage:
    isComponent: true
    inputProperties:
        indexContent:
          type: string
          description: The HTML content for index.html.
    requiredInputs:
        - indexContent
    properties:
        bucket:
          "$ref":
"/aws/v4.0.0/schema.json#/resources/aws:s3%2Fbucket:Bucket"
          description: The bucket resource.
        websiteUrl:
          type: string
          description: The website URL.
    required:
        - bucket
        - websiteUrl
```

staticPage.go

```
package provider
import (
        "github.com/pulumi/pulumi-aws/sdk/v4/go/aws/s3"
        "github.com/pulumi/pulumi/sdk/v3/go/pulumi"
)
// The set of arguments for creating a StaticPage component
resource.
type StaticPageArgs struct {
        // The HTML content for index.html.
        IndexContent pulumi.StringInput 'pulumi:"indexContent"'
}
//The StaticPage component resource.
type StaticPage struct {
        pulumi.ResourceState
        Bucket        *s3.Bucket        'pulumi:"bucket"'
        WebsiteUrl pulumi.StringOutput 'pulumi:"websiteUrl"'
}
// NewStaticPage creates a new StaticPage component resource.
func NewStaticPage(ctx *pulumi.Context,
        name string, args *StaticPageArgs, opts
...pulumi.ResourceOption) (*StaticPage, error) {
        if args == nil {
                args = &StaticPageArgs{ }
        }
        component := &StaticPage{ }
        err :=
ctx.RegisterComponentResource("xyz:index:StaticPage", name,
component, opts...)
        if err != nil {
                return nil, err
        }
        // Create a bucket and expose a website index document.
        bucket, err := s3.NewBucket(ctx, name, &s3.BucketArgs{
                Website: s3.BucketWebsiteArgs{
                   IndexDocument: pulumi.String("index.html"),
                },
        }, pulumi.Parent(component))
        if err != nil {
                return nil, err
        }
```

-continued

```
        // Create a bucket object for the index document.
        if _, err := s3.NewBucketObject(ctx, name,
&s3.BucketObjectArgs {
                Bucket:        bucket.ID( ),
                Key:           pulumi.String("index.html"),
                Content:       args.IndexContent,
                ContentType:   pulumi.String("text/html"),
        }, pulumi.Parent(bucket)); err != nil {
                return nil, err
        }
        // Set the access policy for the bucket so all objects are
readable.
        if _, err := s3.NewBucketPolicy(ctx, "bucketPolicy",
&s3.BucketPolicyArgs{
                Bucket: bucket.ID( ),
                Policy: pulumi.Any(map[string]interface{ }{
                   "Version": "2012-10-17",
                   "Statement": [ ]map[string]interface{ }{
                      {
                         "Effect":   "Allow",
                         "Principal": "*",
                         "Action": [ ]interface{ }{
                            "s3:GetObject",
                         },
                         "Resource": [ ]interface{ }{
        pulumi.Sprintf("arn:aws:s3:::%s/*", bucket.ID( )), // policy
refers to bucket name explicitly
                         },
                      },
                   },
                }),
        }, pulumi.Parent(bucket)); err != nil {
                return nil, err
        }
        component.Bucket = bucket
        component.WebsiteUrl = bucket.WebsiteEndpoint
        if err := ctx.RegisterResourceOutputs(component,
pulumi.Map{
                "bucket":      bucket,
                "websiteUrl": bucket.WebsiteEndpoint,
        }); err != nil {
                return nil, err
        }
        return component, nil
}
```

staticPage.ts

```
// *** WARNING: this file was generated by Pulumi SDK Generator.
***
// *** Do not edit by hand unless you're certain you know what
you are doing! ***
import * as pulumi from "@pulumi/pulumi";
import * as utilities from "./utilities";
import * as aws from "@pulumi/aws";
export class StaticPage extends pulumi.ComponentResource {
        /** @internal */
        public static readonly __pulumiType =
'xyz:index:StaticPage';
        /**
         * Returns true if the given object is an instance of
StaticPage. This is designed to work even
         * when multiple copies of the Pulumi SDK have been loaded
into the same process.
         */
        public static isInstance(obj: any): obj is StaticPage {
           if (obj === undefined || obj === null) {
              return false;
           }
           return obj['__pulumiType'] === StaticPage.__pulumiType;
        }
        /**
         * The bucket resource.
         */
        public /*out*/ readonly bucket!:
pulumi.Output<aws.s3.Bucket>;
        /**
         * The website URL.
         */
        public /*out*/ readonly websiteUrl!: pulumi.Output<string>;
```

-continued

```
        /**
         * Create a StaticPage resource with the given unique name,
arguments, and options.
         *
         * @param name The _unique_ name of the resource.
         * @param args The arguments to use to populate this
resource's properties.
         * @param opts A bag of options that control this resource's
behavior.
         */
        constructor(name: string, args: StaticPageArgs, opts?:
pulumi.ComponentResourceOptions) {
            let inputs: pulumi.Inputs = { };
            opts = opts || { };
            if (!opts.id) {
                if ((!args || args.indexContent === undefined) &&
!opts.urn) {
                    throw new Error("Missing required property
'indexContent'");
                }
                inputs["indexContent"] = args ? args.indexContent :
undefined;
                inputs["bucket"] = undefined /*out*/;
                inputs["websiteUrl"] = undefined /*out*/ ;
            } else {
                inputs["bucket"] = undefined /*out*/;
                inputs["websiteUrl"] = undefined /*out*/;
            }
            if (!opts.version) {
                opts = pulumi.mergeOptions(opts, { version:
utilities.getVersion ( ) } ) ;
            }
            super(StaticPage.__pulumiType, name, inputs, opts, true
/*remote*/) ;
        }
}
/**
 * The set of arguments for constructing a StaticPage resource.
 */
export interface StaticPageArgs {
        /**
         * The HTML content for index.html.
         */
        readonly indexContent: pulumi.Input<string>;
}
```

index.ts

```
import * as xyz from "@pulumi/xyz";
const page = new xyz.StaticPage ("page", {
    indexContent: "<html><body><p>Hello world !</p></body></html>",
});
export const bucket = page.bucket;
export const url = page.websiteUrl;
```

What is claimed is:

1. A computer-implemented method of specifying a desired state of a cloud computing infrastructure, the computer-implemented method comprising:

receiving, from a client device, a computer program comprising an instruction for creating an instance of a component, the instruction including a set of input parameters for creating the instance;

creating the component based on the instruction, wherein the component includes a plurality of resources, the plurality of resources including one or more of a compute resource, a storage resource, or a network resource, wherein the component includes logic that defines a desired state configuration authored in a first procedural configuration language, wherein the component comprises one or more child components, wherein at least a child component is authored in a second procedural configuration language that is different from the first procedural configuration language, and wherein the component comprises a schema authored in a declarative language, the schema specifying output properties of the component, and the declarative language different from the first procedural configuration language and the second procedural configuration language;

determining a list of needed resources by comparing the desired state configuration specified to a current state configuration of an environment in a cloud computing provider, the list of needed resources including the plurality of resources of the component;

generating a software development kit (SDK) for the second procedural configuration language based on the schema of the component, wherein the SDK enables cross-language instantiation of the component from the computer program written in the first procedural configuration language within a desired state configuration system for managing the cloud computing infrastructure, the SDK being generated from the schema to enable component reuse across different procedural configuration languages;

generating, by a service, a complete set of output properties for the list of needed resources by performing a recursive process comprising, for one or more iterations of the recursive process:

constructing the list of needed resources with the set of input parameters, generating a set of output properties for the list of needed resources, wherein at least one resource and corresponding output properties for the child component is constructed by using the SDK for the second procedural configuration language, determining whether a terminating condition is achieved based on whether additional resources to be constructed are physical resources or component resources, wherein the terminating condition is achieved when the additional resources to be constructed are physical resources, and responsive to determining that the terminating condition is not achieved invoking another recursive process to construct at least an additional component configured to construct additional resources;

responsive to determining that the terminating condition is achieved, terminating the recursive process and defining the complete set of output properties to include each generated set of output properties; and providing the complete set of output properties to the client device, the complete set of output properties representing information associated with the list of needed resources constructed within the cloud computing provider.

2. The method of claim 1, wherein the terminating condition is that the plurality of resources does not depend on another component resource.

3. The method of claim 1, further comprising generating, based on a schema for the component, a language-specific software development kit (SDK) for the component in each of a plurality of different procedural configuration languages, the SDK for a procedural configuration language allowing use of the component from that procedural programming language.

4. The method of claim 1, wherein the recursive process further comprises creating a child component that depends on the component, wherein the child component is authored in a third procedural configuration language.

5. The method of claim 1, wherein constructing the plurality of resources further comprises:

looking up resource provider information based on the set of input parameters; and calling a constructor function based on the resource provider information.

6. The method of claim 1, wherein the set of output properties include a handle that drives construction of the additional resources.

7. The method of claim 1, wherein the set of output properties include a plurality of resource references generated based on the plurality of resources.

8. The method of claim 1, wherein each of the first procedural configuration language and the second procedural configuration language is one of: JavaScript, TypeScript, Python, Go, C#, F #, or HCL.

9. A non-transitory computer-readable storage medium storing executable computer instructions that, when executed by one or more processors, cause the one or more processors to perform steps comprising:

receiving, from a client device, a computer program comprising an instruction for creating an instance of a component, the instruction including a set of input parameters for creating the instance;

creating the component based on the instruction, wherein the component includes a plurality of resources, the plurality of resources including one or more of a compute resource, a storage resource, or a network resource, wherein the component includes logic that defines a desired state configuration authored in a first procedural configuration language, wherein the component comprises one or more child components, wherein at least a child component is authored in a second procedural configuration language that is different from the first procedural configuration language, and wherein the component comprises a schema authored in a declarative language, the schema specifying output properties of the component, and the declarative language different from the first procedural configuration language and the second procedural configuration language;

determining a list of needed resources by comparing the desired state configuration specified to a current state configuration of an environment in a cloud computing provider, the list of needed resources including the plurality of resources of the component;

generating a software development kit (SDK) for the second procedural configuration language based on the schema of the component, wherein the SDK enables cross-language instantiation of the component from the computer program written in the first procedural configuration language within a desired state configuration system for managing a cloud computing infrastructure, the SDK being generated from the schema to enable component reuse across different procedural configuration languages;

generating, by a service, a complete set of output properties for the list of needed resources by performing a recursive process comprising, for one or more iterations of the recursive process:

constructing the list of needed resources with the set of input parameters, generating a set of output properties for the list of needed resources, wherein at least one resource and corresponding output properties for the child component is constructed by using the SDK for the second procedural configuration language, determining whether a terminating condition is achieved based on whether additional resources to be constructed are physical resources or component resources, wherein the terminating condition is achieved when the additional resources to be constructed are physical resources, and responsive to determining that the terminating condition is not achieved invoking another recursive process to construct at least an additional component configured to construct additional resources;

responsive to determining that the terminating condition is achieved, terminating the recursive process and defining the complete set of output properties to include each generated set of output properties; and providing the complete set of output properties to the client device, the complete set of output properties representing information associated with the list of needed resources constructed within the cloud computing provider.

10. The non-transitory computer-readable storage medium of claim 9, wherein the terminating condition is that the plurality of resources does not depend on another component resource.

11. The non-transitory computer-readable storage medium of claim 9, further comprising generating, based on a schema, a language-specific software development kit (SDK) in the first procedural configuration language.

12. The non-transitory computer-readable storage medium of claim 9, wherein the recursive process further comprises creating a child component that depends on the component, wherein the child component is authored in a third procedural configuration language.

13. The non-transitory computer-readable storage medium of claim 9, wherein constructing the plurality of resources further comprises:

looking up resource provider information based on the set of input parameters; and calling a constructor function based on the resource provider information.

14. The non-transitory computer-readable storage medium of claim 9, wherein the set of output properties include a handle that drives construction of the additional resources.

15. The non-transitory computer-readable storage medium of claim 9, wherein the set of output properties include a plurality of resources references generated based on the plurality of resources.

16. A system comprising:

one or more processors configured to execute instructions; and a memory storing instructions for execution on the one or more processors, including instructions causing the one or more processors to:

receive, from a client device, a computer program comprising an instruction for creating an instance of a component, the instruction including a set of input parameters for creating the instance;

create the component based on the instruction, wherein the component includes a plurality of resources, the plurality of resources including one or more of a compute resource, a storage resource, or a network resource, wherein the component includes logic that defines a desired state configuration authored in a first procedural configuration language, wherein the component comprises one or more child components, wherein at least a child component is authored in a second procedural configuration language that is different from the first procedural configuration language, and wherein the component comprises a schema authored in a declarative language, the schema specifying output properties of the component, and the declarative language different from the first procedural configuration language and the second procedural configuration language;

determine a list of needed resources by comparing the desired state configuration specified to a current state configuration of an environment in a cloud computing provider, the list of needed resources including the plurality of resources of the component;

generate a software development kit (SDK) for the second procedural configuration language based on the schema of the component, wherein the SDK enables cross-language instantiation of the component from the computer program written in the first procedural configuration language within a desired state configuration system for managing a cloud computing infrastructure, the SDK being generated from the schema to enable component reuse across different procedural configuration languages;

generate, by a service, a complete set of output properties for the list of needed resources by performing a recursive process causing the one or more processors to, for one or more iterations of the recursive process:

construct the list of needed resources with the set of input parameters, generate a set of output properties for the list of needed resources, wherein at least one resource and corresponding output properties for the child component is constructed by using the SDK for the second procedural configuration language, determine whether a terminating condition is achieved based on whether additional resources to be constructed are physical resources or component resources, wherein the terminating condition is achieved when the additional resources to be constructed are physical resources, and responsive to determining that the terminating condition is not achieved invoke another recursive process to construct at least an additional component configured to construct additional resources;

responsive to determining that the terminating condition is achieved, terminate the recursive process and defining the complete set of output properties to include each generated set of output properties; and provide the complete set of output properties to the client device, the complete set of output properties representing information associated with the list of needed resources constructed within the cloud computing provider.

17. The system of claim 16, wherein the terminating condition is that the plurality of resources does not depend on another component resource.

18. The system of claim 16, wherein the instructions further cause the one or more processors to generate, based on a schema, a language-specific software development kit (SDK) in the first configuration language.

19. The system of claim 16, wherein constructing the plurality of resources further comprises:

looking up resource provider information based on the set of input parameters; and calling a constructor function based on the resource provider information.

* * * * *